Sept. 5, 1961       A. RYBA       2,998,877
ELECTROMAGNETIC FRICTION CLUTCH
Filed Nov. 20, 1956       2 Sheets-Sheet 1
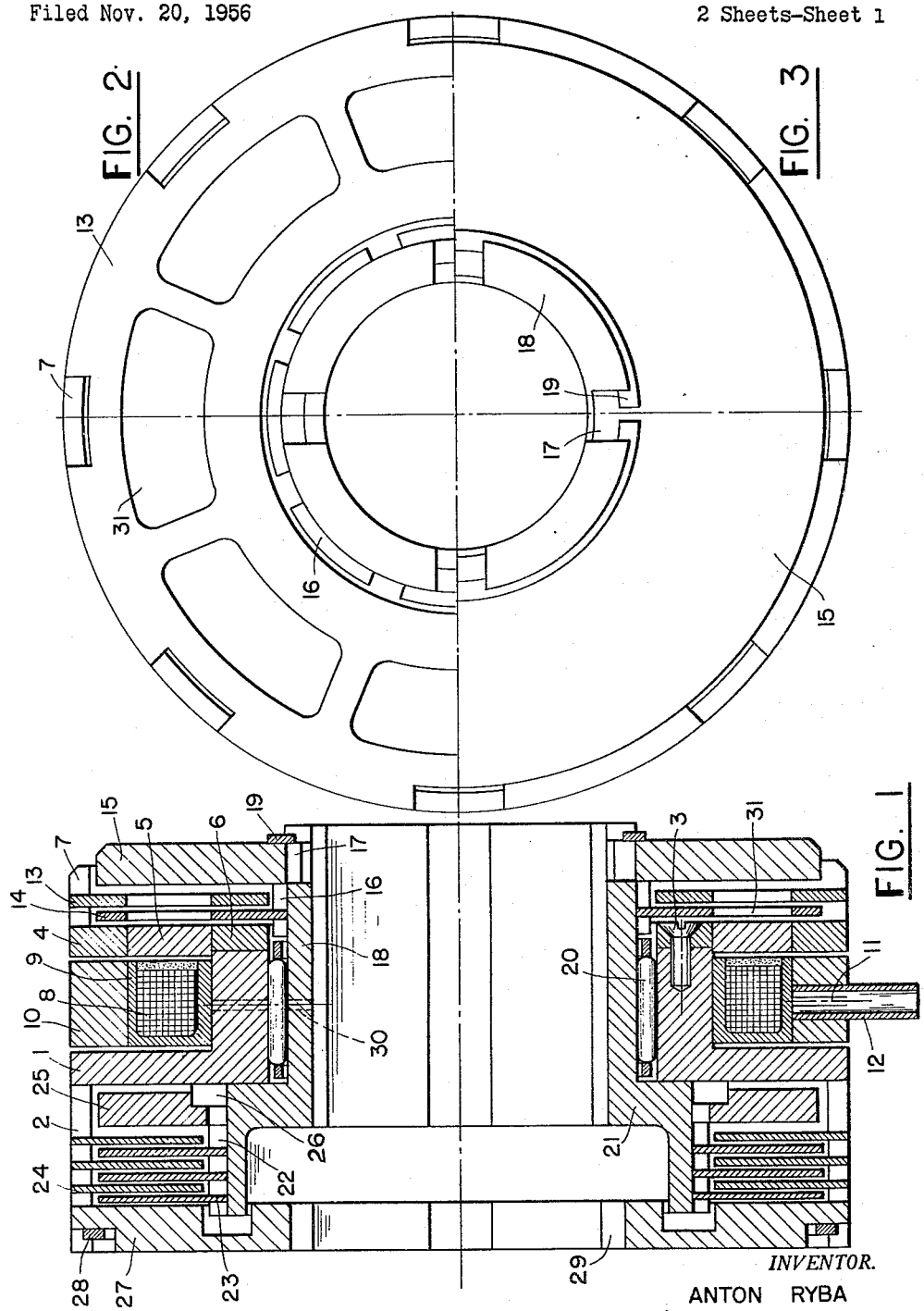
INVENTOR.
ANTON RYBA
ATTORNEYS Sept. 5, 1961 A. RYBA 2,998,877
ELECTROMAGNETIC FRICTION CLUTCH
Filed Nov. 20, 1956 2 Sheets-Sheet 2

INVENTOR.
ANTON RYBA
BY
ATTORNEYS

United States Patent Office 2,998,877
Patented Sept. 5, 1961

2,998,877
ELECTROMAGNETIC FRICTION CLUTCH
Anton Ryba, Bolzano, Italy, assignor, by direct and mesne assignments, to Zahnradfabrik Friedrichshafen, Friedrichshafen, Germany, a corporation of Germany
Filed Nov. 20, 1956, Ser. No. 623,387
Claims priority, application Austria Nov. 23, 1955
6 Claims. (Cl. 192—84)

The present invention relates to electromagnetic friction couplings for coupling two members by a force transmitting engagement of two coupling members.

There are known friction couplings in which the magnetic flux lines traverse a set of force transmitting friction discs and which hence do not require resetting. There are also known friction couplings in which the force is partly mechanically transmitted by the engagement of a set of friction discs and partly by the magnetic force of attraction exerted upon friction elements in an electromagnetic array functionally separated from the purely mechanically actuated set of friction discs or elements.

The first mentioned kind of couplings has the disadvantage that the force transmitting friction elements must be made of ferromagnetic material, the wear resistance of which is comparatively low, and the second mentioned kind of couplings has the advantage that the force transmitting elements may be made partly of a material which has better wear resistant properties than ferromagnetic material, but the disadvantage that there must be an air gap in the electromagnetic array which entails resetting of the force transmitting elements of this array from time to time.

The principal object of the present invention is to provide a novel and improved electromagnetic friction coupling which combines the advantages of both hereinabove referred to kinds of couplings while eliminating the disadvantages thereof in that the force transmitting friction surfaces may consist partly of non-magnetic, that is, highly resistant material without the need of providing an air gap which entails resetting.

Another object of the invention is to provide a novel and improved electromagnetic friction coupling of the kind in which the mechanically actuated friction array and the electromagnetic array are functionally separated and in which any wear experienced by the components of the electromagnetic array is automatically compensated.

Still another object of the invention is to provide a novel and improved electromagnetic friction coupling of the kind above referred to, which permits a distribution of the force to be transmitted between the mechanical array and the electromagnetic array which is most favorable for the operation of the coupling.

The aforedescribed objects, features and advantages of the invention and other objects, features and advantages which will be pointed out hereinafter and set forth in the appended claims forming part of the application, are attained by providing in the electromagnetic array of the coupling friction surfaces of a ferromagnetic material having a lower wear resistance than the material of the friction surfaces in the mechanical array of the coupling. Ferromagnetic sintered metal and cast iron have been found suitable for the purpose. These materials may be utilized in the form of solid friction elements or of layers on one or both sides of a carrier element.

According to a further development of the invention, the areas of the coacting frictional surfaces in the mechanical array and the electromagnetic array respectively of the coupling are related so that the specific frictional load per area unit is materially higher in the electromagnetic array than in the mechanical array. It has been found that such a distribution of the specific load contributes materially to the automatic resetting of the friction elements of the coupling for a very prolonged period of service.

Another development of the invention resides in concentrating the density of the magnetic field traversing the electromagnetic array by providing constrictions in the pole faces or in the friction elements. This affords the advantage of increasing the force of the magnetic attraction between coacting friction elements in the electromagnetic array of the coupling.

In the accompanying drawing several preferred embodiments of the invention are shown by way of illustration and not by way of limitation.

In the drawing:

FIG. 1 is a cross section of an electromagnetic friction coupling according to the invention which includes several pairs of coacting friction discs in both the mechanical array and the electromagnetic array.

FIG. 2 is a side view of the upper half of FIG. 1 as seen from the right side, the armature being removed.

FIG. 3 is a similar view of the lower side of FIG. 1, but including the armature.

Figure 6:
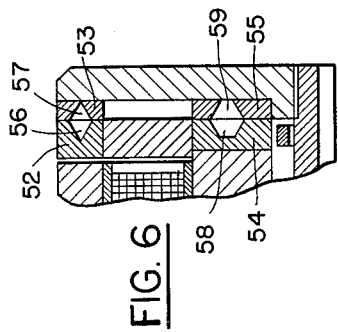
FIG. 6 is a fragmentary section of the coupling showing a modification of the means for concentrating the magnetic field by constriction of the pole faces.

Referring first to FIGURES 1, 2, 3 in detail, the electromagnetic friction coupling according to these figures comprises in its electromagnetic array a ring member 1 which mounts claws 2. Ring 1 is secured by means of a screw 3 to a disc which is formed by rings 4, 5 and 6 and mounts claws 7. Rings 1, 4 and 6 are made of ferromagnetic material whereas the intermediate ring 5 is preferably made of a non-magnetic material and is fixedly secured to rings 4 and 6. An exciting coil 8 is disposed in an annular housing 9 preferably made of non-magnetic material and having a U-shaped cross section. The coil is embodied in a hardened mass of insulation material and housing 9 is fixedly secured to a ring 10 of ferromagnetic material. Conductors for coil 8 are led out through a short pipe 12 which is inserted in ring 10 and may also be used for holding stationary the parts 8, 9 and 10 of the electromagnetic array.

As appears from the previous description, the electromagnetic array comprises a stationary part including the components 8, 9 and 10 and a rotary part including the components 1, 4, 5 and 6. As the exciting coil 8 is included in the stationary part a slip-ringless connection may be used.

Claws 7 on ring 4 mount in force transmitting engagement the outer friction disc 13 of the electromagnetic array. This disc coacts with the inner friction disc 14 secured by means of claws 16 to a sleeve 18 preferably made of non-magnetic material. Discs 13 and 14 constitute coupling discs. Similarly, an armature 15 is rotationally secured by means of claws 17 to sleeve 18 and retained in axial direction by a circlip 19. Furthermore, the entire electromagnetic assembly is journalled on sleeve 18 by a bearing 20 of suitable design. Sleeve 18 serves to receive one of the members to be coupled which may be visualized as a shaft keyed to the sleeve.

The described electromagnet assembly and friction discs 13 and 14 constitute the electromagnetic array of the coupling.

Sleeve 18 has a diametrically enlarged portion 21 including grooves 22 in which are force-fitted or otherwise secured the inner friction discs 23 of the mechanical array of the coupling. Discs 23 coact with outer friction discs 24 inserted in claws 2 of annular body 1. The axial pressure for moving friction discs 23 and 24 into frictional engagement is transmitted to the discs by a disc 25 which in turn abuts against a shoulder 26 on the grooved portion 21, 22. The respective end disc 23 abuts against a ring member 27 secured to claws 2 by means of a circlip 28 or other suitable means. Ring 27 also serves to receive the second member to be coupled such as a shaft and is provided for this purpose with claws or keys 29 engageable with the shaft. End discs 25 and 27 in conjunction with friction discs 23 and 24 constitute the mechaniacal array of the coupling.

Bearing 20 and the engaging surfaces between the stationary and the rotary components of the electromagnet can be lubricated through a bore 30 which is indicated in dashed lines.

Friction discs 23 and 24 of the mechanical friction array of the coupling may be made of any suitable material of sufficiently high wear resistance. Materials appropriate for the purpose are well known in the art.

The friction discs 13 and 14 of the electromagnetic array must be made of ferromagnetic material so that they can conduct the magnetic field. To prevent a premature closing of the magnetic flux or substantial shunt fields, the outer pole rings should be magnetically separated as far as possible from the inner pole rings of the friction discs. To this end, window-like cutouts 31 or other suitable means may be provided. The non-magnetic intermediate ring 5 of the electromagnet may also be replaced by window-like recesses in an otherwise solid ferromagnetic disc.

According to the invention, the friction surfaces of discs 13 and 14 in the electromagnetic array of the coupling have a wear resistance considerably less than the wear resistance of the material forming the friction surfaces of discs 23 and 24 in the mechanical array of the coupling so that the friction surfaces in the electromagnetic array will experience a more rapid wear than the frictional surfaces in the mechanical array.

Suitable metals are, for instance, sintered iron or a cast iron with relatively low wear resistance. The appropriate compositions of these metals and other metals suitable for the purpose are well known in the art.

Each pair of friction discs in the electromagnetic array may be layered on one side with sintered metal and consist on the other side of homogeneous ferromagnetic material such as steel or iron. A layer of cast iron on steel or iron, or cast iron on sintered material may also be advantageously used. Finally, each friction disc may be coated on both sides with a layer of ferromagnetic sintered metal or cast iron. These friction surfaces of sintered metal or cast iron may be adhered to a ferromagnetic carrier element by sintering or any other suitable operation known in the art.

The friction surfaces of the friction discs 23 and 24 in the mechanical array of the coupling may be made of any material suitable for the purpose, provided that such material has a sufficient wear resistance, that is, a wear resistance higher than that of the friction surfaces in the electromagnetic array.

The thickness of the layer of sintered metal or cast iron, or the thickness of the friction discs made of such material is freely selective within wide limits. The number of pairs of friction surfaces in both the mechanical and the electromagnetic array of the coupling is also freely selective within wide limits. The wear resistance of the friction surfaces in the electromagnetic array must be, as previously described, in a predetermined relation to the wear resistance of the friction surfaces in the mechanical array which relation is also influenced by the distribution of the specific forces of attraction applied to the friction surfaces. It has been found advantageous to provide for each pair of friction surfaces in the electromagnetic array several pairs of friction surfaces in the mechanical array. It has been found that an electromagnetic friction coupling capable of transmitting a high moment and of remaining operative without resetting is attained by maintaining the aforedescribed relations.

The operation of a friction coupling, as hereinbefore described, is as follows:

When exciting coil 8 is energized a magnetic field is generated which closes through the ferromagnetic parts of the electromagnet. As a result, armature 15 and friction discs 13, 14 are attracted. As armature 15 is secured to the sleeve, the latter will follow an axial displacement of the armature in either direction. The displacement of the sleeve in a response to the attraction of the armature is transmitted from the electromagnetic array to the mechanical array through disc 25 and from this disc to friction discs 23 and 24.

Let it now be assumed that friction discs 13, 14 and friction discs 23 and 24 are all in engagement upon attraction of the armature, the magnetic force of attraction generated in the electromagnetic array will distribute itself upon all the engaged frictional surfaces at a certain ratio; hence a moment of rotation is generated which can be transmitted and is the resultant of all the moments on the individual friction surfaces. The distribution of the magnetically produced force of attraction and the portion of the moment of rotation assigned to the individual friction surfaces depends upon several factors and can be largely influenced by the steps and means according to the invention, to wit:

(1) By the number of pairs of friction surfaces in both, the magnetic and the mechanical array of the coupling. If, for instance, the number of pairs of frictional surfaces in both arrays of the coupling is equal, the areas of the friction surfaces are also equal and the wear resistance is equal, the magnetically generated force of attraction will distribute itself substantially uniform upon all friction surfaces, disregarding other influences in the magnetic array such as magnetic leakage and possible magnetic shunts. If the distribution of the pairs of friction surfaces upon the two arrays is changed, the moment of rotation assigned to each pair will correspondingly change.

(2) By the selection of the specific force of attraction (kg./cm.$^2$) in both the magnetic and the mechanical array. If, for instance, the individual surfaces of the friction discs in the mechanical array are considerably larger than in the electromagnetic array and the wear resistances of all friction surfaces are about equal, the specific force of attraction in the electromagnetic array will be higher per area unit than in the mechanical array. As a result, the friction discs 13, 14 in the electromagnetic array will experience a faster wear than the friction discs 23, 24 in the mechanical array. Consequently, a larger portion of the magnetically generated total force of attraction will be shifted from the magnetic array to the mechanical array since the wear of the friction discs or friction surfaces will progress more rapidly in the magnetic array than in the mechanical array, but only a uniform progress of the wear for all the friction surfaces is possible.

(3) By selecting the characteristics of the material for the friction surfaces in both the electromagnetic and the mechanical array. If now the material for the friction surfaces in the electromagnetic array has a low wear resistance and the material for the friction surfaces in the mechanical array has a high wear resistance, the friction discs 13 and 14 in the magnetic array experience a more rapid wear than the friction surfaces 23 and 24 in the mechanical array. However, since both arrays are functionally separated, but structurally combined, the wear must progress uniformly in both arrays because a reduction of the pressure in the magnetic array immediately and automatically results in a corresponding increase in pressure in the mechanical array. Consequently, a larger portion of the magnetically produced total force of attraction is shifted from the magnetic array to the mechanical array, whereby the latter transmits the major portion of the total transmittable moment of a rotation.

The highest possible efficiency of the coupling is attained when all the aforedescribed steps and operations are suitably combined, to wit:

Low wear resistance and high specific loading per area unit of the friction surfaces in the magnetic array and high wear resistance and low specific loading per area unit of the friction surfaces in the mechanical array in the manner previously explained. As to the number of pairs of friction surfaces in the magnetic array of the coupling, it has been previously stated that this number should be in a selected relationship to the number of pairs of friction surfaces in the mechanical array. This relation is advantageously selected so that the total wear of the set of friction discs or surfaces in the mechanical array of the coupling can be readily compensated by the total wear of the set of friction discs or surfaces in the electromagnetic array without requiring a material or prolonged shifting of the force of pressure from the mechanical array to the magnetic array. In practice it has been found advantageous to associate with each pair of friction surfaces in the magnetic part several pairs of friction surfaces in the mechanical array.

Inasmuch as all the friction surfaces are in force transmitting engagement when the coupling is actuated and only a shifing of the distribution of the magnetically generated total force of attraction occurs, the wear progresses uniformly on all friction surfaces, or, in other words, the coupling resets itself automatically and in accordance with the wear on the friction surfaces.

Figure 4:
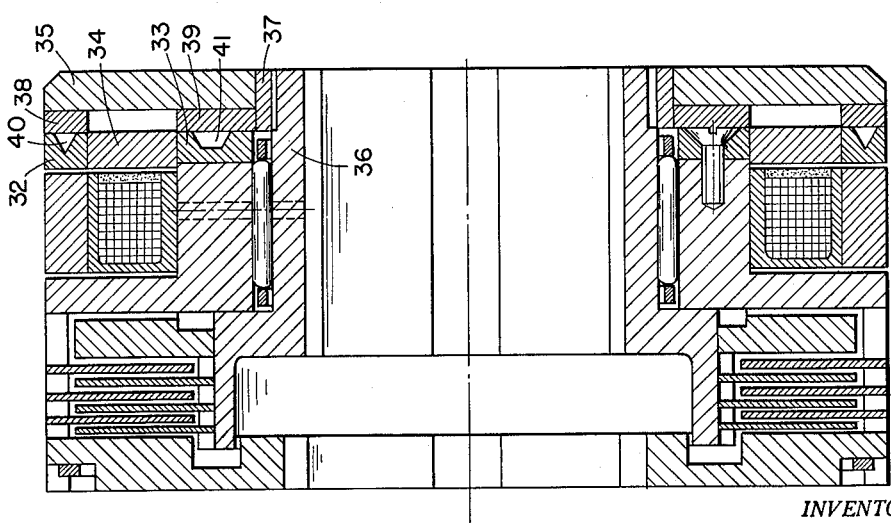
FIG. 4 is a cross section of a modification of the coupling in which a single pair of friction discs is provided in the electromagnetic array and which includes means for concentrating the magnetic field at the poles.

FIG. 4 shows a multiple disc coupling which has only one pair of friction surfaces in the magnetic array and which includes means for providing the highest possible specific pressure per area unit in the magnetic array. The mechanical array of the coupling is basically the same as has been described in connection with FIG. 1. According to FIG. 4, the pair of friction surfaces in the magnetic array of the coupling is formed by the juxtaposed boundary surfaces of the ferromagnetic rings 32, 33 and armature 35. Rings 32 and 33 are joined by a non-magnetic intermediate ring 34 to form a composite disc similar to the corresponding disc in FIG. 1. Non-magnetic ring 34 may be replaced by window-like recesses in the zone of the housing coil. Armature 35 is fixedly secured to a sleeve 36 which serves to receive one of the members to be coupled. Sleeve 36 may be made of non-magnetic material, or a non-magnetic ring 37 may be interposed. According to the invention, the pair of friction surfaces in the magnetic array is again made of material which has less wear resistance than the material used for the friction surfaces in the mechanical array. The respective materials and the respective areas of the friction surfaces are selected as has been discussed in connection with FIG. 1 to obtain the desired progress of the wear and the desired distribution of the force of attraction. Rings 38 and 39 which are adhered to armature 35 indicate layers of suitable material on the armature. The discs may again be layered on both sides or one side with the specific material of the invention, or the discs proper may consist of such a material.

Rings 32 and 33 are shown as being formed with annular grooves 40 and 41 respectively which serve to concentrate the magnetic field at the poles of the electromagnet and hence at the friction surfaces of the magnetic array for the purpose of obtaining the highest possible density of the field lines in this area. As is well known, the magnetic force of attraction is proportional to the square of the density of the field lines. This, in turn, results in an advantageous high specific force of attraction in the magnetic array of the coupling.

While there are shown a V-shaped groove and a frusto-conical groove, the configuration of the pole constrictions is not critical and any other configuration may be selected which produces the same result.

The operation of the embodiment of the coupling shown in FIG. 4 is the same as has been described in connection with FIGS. 1 to 3 and is evident.

Figure 5:
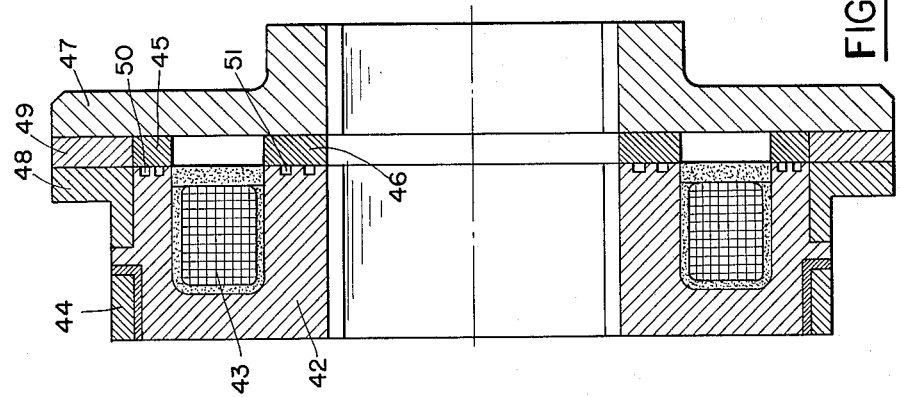
FIG. 5 is a cross section of another modification of the coupling in which the friction surfaces in the mechanical array and in the electromagnetic array are situated in the same plane.

FIG. 5 shows a single disc coupling according to the invention. In the coupling of FIG. 5, the friction surfaces in the magnetic array are formed by the juxtaposed boundary surfaces of parts 42, 45 and 46 and the friction surfaces in the mechanical array are formed by the juxtaposed boundary surfaces of rings 48 and 49. These friction surfaces are situated in the same plane. An exciting coil 43 is embedded by means of a hardened insulation mass in magnet body 42. Connections for exciting coil 43 are made over a slip ring 44 and through the mass. Of course, any other suitable connection may also be used.

Ring members 45 and 46 are disposed opposite magnet body 42 and fixedly secured to an armature 47. Parts 42, 45, 46 and 47 constitute the magnetic array and parts 48 and 49 the mechanical array of the coupling.

It is again advantageous to provide pole constrictions as indicated at 50 and 51 to obtain the highest possible density of the field and hence a high specific loading per area unit at the friction surfaces of the magnetic array.

In a single disc coupling it is especially advantageous to make the friction surfaces of parts 48 and 49 in the mechanical array materially larger than the friction surfaces at parts 42, 45 and 46.

The pole constrictions for concentrating the magnetic field at the friction surfaces of the magnetic array can be designed and shaped in any suitable manner. In this connection it may be mentioned that in the coupling of FIGS. 1 to 3 pole constrictions may be provided at the poles of the electromagnet, at the friction surfaces or discs 13, 14 and also at the armature 15.

FIG. 6 shows a different arrangement of a pole constriction in which the two juxtaposed friction discs 52, 53 and 54, 55 of the magnetic array comprise pole constrictions 56, 57 and 58, 59 for concentrating the magnetic field at the friction surfaces in the electromagnetic array of the coupling to the highest possible extent.

Figure 7:
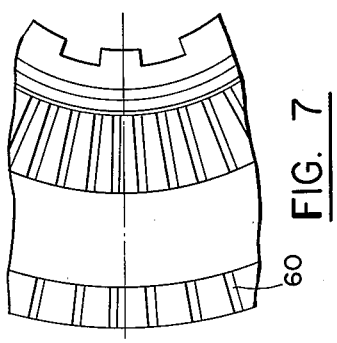
FIG. 7 is a fragmentary plan view of another form of constriction of the pole faces.

Finally, FIG. 7 shows pole constrictions in form of radial recesses 60 in the friction surfaces. It is also possible to obtain the pole constrictions by providing a spiral thread in the plane of the friction surfaces or pole surfaces.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desire to be secured by Letters Patent, is:

1. In an electromagnetic friction coupling for releasably coupling two aligned rotary parts, a first and a second coupling member rotatable about a common axis, the first coupling member comprising a first group of axially spaced coupling discs secured to said first coupling member for joint rotation therewith, and the second coupling member comprising a rotatable coupling sleeve axially displaceable in reference to said first coupling member, at least one magnetizable coupling disc and an armature secured to said sleeve at one end thereof and a second group of coupling discs secured to the sleeve at the other end thereof, the coupling discs of said second group interspacing the coupling discs of the first group and being frictionally engageable therewith to form a mechanical coupling array, a magnetizable disc rotatable about said coupling sleeve and fixed to the first coupling member for rotation in unison therewith, at least one magnetizable coupling disc secured to said magnetizable disc axially spaced therefrom and rotatable jointly therewith, said magnetizable coupling discs being interposed between said magnetizable disc rotatable about the sleeve and said armature, said magnetizable coupling discs secured to the sleeve and the rotatable magnetizable disc respectively, said magnetizable disc rotatable about the sleeve and said armature being magnetically and frictionally engageable with each other to form an electromagnetic array, and energizing means for generating a magnetic field closing through said electromagnetic array to attract the armature toward said magnetizable disc rotatable about the sleeve, said attraction of the armature moving the coupling discs of the mechanical array into engagement with each other and the coupling discs of the electromagnetic array into engagement with each other and the rotatable magnetizable disc and the armature respectively, whereby each of said arrays transmits a portion of the total torque to be transmitted from one coupling member to the other.

2. A coupling according to claim 1 wherein at least one of the engaging surfaces in the electromagnetic array has less wear resistance in response to a given load per area unit than the engaging surfaces in the mechanical array for a given load per unit area.

3. A coupling according to claim 1, wherein the engaging surfaces of the coupling discs in the electromagnetic array are made of ferromagnetic sintered metal.

4. A coupling according to claim 1, wherein the engaging surfaces of the coupling discs in the electromagnetic array are made of cast iron.

5. A coupling according to claim 1, wherein the coupling discs of said electromagnetic array are composite discs comprising a carrier disc of ferromagnetic material coated on at least one side with a layer of a material having a lesser wear resistance than the engaging surfaces in the mechanical array.

6. A coupling according to claim 1 wherein for each pair of engaging surfaces in the electromagnetic array several pairs of engaging surfaces are provided in the mechanical array.

References Cited in the file of this patent

UNITED STATES PATENTS

| 1,756,907 | Payne | Apr. 29, 1930 |
| 2,267,114 | Lear | Dec. 23, 1941 |

FOREIGN PATENTS

| 556,182 | Great Britain | Sept. 23, 1943 |
| 722,768 | Great Britain | Jan. 26, 1955 |